(12) United States Patent
Geng et al.

(10) Patent No.: US 11,794,087 B1
(45) Date of Patent: Oct. 24, 2023

(54) PET BALL LAUNCHER (71) Applicant: SHENZHEN UAH TECHNOLOGY CO., LTD, Guangdong (CN)

(72) Inventors: Qiang Geng, Guangdong (CN); Shengbo Lu, Guangdong (CN); Baihua Luo, Guangdong (CN); Hao Xu, Guangdong (CN); Hao Wang, Guangdong (CN)

(73) Assignee: SHENZHEN UAH TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/881,679

(22) Filed: Aug. 5, 2022

(30) Foreign Application Priority Data

Jul. 8, 2022 (CN) .......................... 202210799396.5

(51) Int. Cl.
*A63B 69/40* (2006.01)
*A01K 15/02* (2006.01)
*F41B 4/00* (2006.01)

(52) U.S. Cl.
CPC ........ *A63B 69/406* (2013.01); *A63B 2208/14* (2013.01)

(58) Field of Classification Search
CPC ..... A63B 69/406; A63B 2208/14; F41B 4/00; A01K 15/025
USPC .................................. 124/78; 119/702, 707
See application file for complete search history.

(56) References Cited

U.S. PATENT DOCUMENTS

| 4,168,695 | A | * | 9/1979 | Haller | A63B 69/408 124/16 |
| 4,267,799 | A | * | 5/1981 | Bacon | A01K 15/025 119/61.2 |
| 4,323,047 | A | * | 4/1982 | McIntosh | A63B 69/406 124/1 |
| 4,995,374 | A | * | 2/1991 | Black | A01K 15/025 124/32 |
| 5,125,653 | A | * | 6/1992 | Kovacs | A63B 69/406 124/78 |
| 5,464,208 | A | * | 11/1995 | Pierce | A63B 69/406 124/78 |
| 6,539,931 | B2 | * | 4/2003 | Trajkovic | A63B 24/00 124/78 |

(Continued)

FOREIGN PATENT DOCUMENTS

| CN | 102614641 A | 8/2012 |
| CN | 105451832 A | 3/2016 |

(Continued)

*Primary Examiner* — Alexander R Niconovich (57) ABSTRACT

Provided is a pet ball launcher, comprising an avoidance drive assembly, a ball throwing assembly, a sensor and a ball serving shell; the ball serving shell is provided with a ball storage space and a launch channel communicated with the ball storage space, and the sensor is installed at an outlet of the launch channel; an output end of the avoidance drive assembly is connected with the ball serving shell, and the ball throwing assembly is installed on the ball serving shell; and when the sensor detects that there is an obstacle in front of the launch channel, the avoidance drive assembly drives the ball serving shell to rotate by a preset angle, the ball throwing assembly throws out a to-be-thrown object from the launch channel, so that the object thrown out of the launch channel avoids the obstacle.

8 Claims, 8 Drawing Sheets

(56) References Cited

U.S. PATENT DOCUMENTS

| | | | | |
|---|---|---|---|---|
| 7,082,938 B2* | 8/2006 | Wilmot | | A63B 69/406 |
| | | | | 124/78 |
| 7,691,012 B2* | 4/2010 | Cucjen | | A63B 69/406 |
| | | | | 124/78 |
| 9,320,960 B1* | 4/2016 | Ward | | A01K 15/02 |
| 9,937,400 B2* | 4/2018 | Hart | | A63B 69/40 |
| 10,456,654 B1* | 10/2019 | Kuo | | A63B 69/0002 |
| 10,625,135 B2* | 4/2020 | Ward | | A01K 15/025 |
| 10,631,522 B2* | 4/2020 | So | | A01K 15/025 |
| 10,898,781 B2* | 1/2021 | Qian | | A63B 69/406 |
| 11,517,830 B2* | 12/2022 | Parsons | | A63H 30/02 |
| 11,590,400 B2* | 2/2023 | Harley | | A63B 69/406 |
| 2003/0125139 A1* | 7/2003 | Gottlieb-Myers | ... | A63B 69/406 |
| | | | | 473/451 |
| 2006/0213453 A1* | 9/2006 | Conrady | | A01K 15/025 |
| | | | | 119/707 |
| 2011/0303208 A1* | 12/2011 | Taylor | | A01K 15/02 |
| | | | | 119/707 |
| 2013/0104869 A1* | 5/2013 | Lewis | | G16H 20/30 |
| | | | | 124/78 |
| 2013/0228138 A1* | 9/2013 | Hamill | | A01K 15/027 |
| | | | | 124/78 |
| 2015/0321059 A1* | 11/2015 | Hussey | | F41B 7/00 |
| | | | | 119/707 |
| 2017/0095716 A1* | 4/2017 | Lewis | | A63B 69/40 |
| 2019/0008120 A1* | 1/2019 | Hamill | | A63B 69/40 |

FOREIGN PATENT DOCUMENTS

| | | |
|---|---|---|
| CN | 206728878 U | 12/2017 |
| CN | 110637750 A | 1/2020 |
| CN | 209995114 U | 1/2020 |
| CN | 212753773 U | 3/2021 |
| CN | 114027215 A | 2/2022 |
| CN | 215774878 U | 2/2022 |
| WO | 2014106852 A1 | 7/2014 |

* cited by examiner

PET BALL LAUNCHER

CROSS REFERENCE TO RELATED APPLICATIONS

The present application claims the benefit of Chinese Patent Application No. 202210799396.5 filed on Jul. 8, 2022, the contents of which are incorporated herein by reference in their entirety.

TECHNICAL FIELD

The application belongs to the technical field of pet toys, in particular to a pet ball launcher.

BACKGROUND

With the development of social economy and the acceleration of urbanization, more and more people like to live in their own small circles, and their interpersonal communication is becoming less and less. Pets such as cats and dogs can be people's friendly companions. These pets can not only help people get rid of loneliness in life, but also adjust people's mental health. As the most loyal partner of people, dogs are one of the most common pets kept by people.

With the continuous progress of science and technology, the application of automatic ball throwing machine is more and more extensive. Automatic ball throwing machine can throw toy balls away, and the thrown balls attract pet dogs to chase, thus achieving the function of walking dogs. In the prior art, although the automatic ball throwing machine can automatically throw toy balls, if people block the front of the launching outlet of the ball throwing machine, the thrown toy balls are likely to hit people directly. Therefore, the high-speed flying toy balls are prone to accidents that hurt people, i. e., the existing automatic ball throwing machine has the problem of low safety factor.

SUMMARY

Aiming at the technical problem that the safety factor of the automatic ball throwing machine in the prior art is not high, the present application provides a pet ball launcher.

In view of the above technical problem, the embodiments of the present application provide a pet ball launcher, including an avoidance drive assembly, a ball throwing assembly, a sensor and a ball serving shell; the ball serving shell is provided with a ball storage space and a launch channel communicated with the ball storage space, and the sensor is installed at an outlet of the launch channel; an output end of the avoidance drive assembly is connected with the ball serving shell, and the ball throwing assembly is installed on the ball serving shell; and when the sensor detects that there is an obstacle in front of the launch channel, the avoidance drive assembly drives the ball serving shell to rotate by a preset angle, the ball throwing assembly throws out a to-be-thrown object from the launch channel, so that the to-be-thrown object thrown out of the launch channel avoids the obstacle.

Optionally, the avoidance drive assembly includes a first drive part, a first gear installed at an output end of the first drive part, and a second gear installed on the ball serving shell; the first gear is meshed with the second gear, and the first drive part drives the ball serving shell to rotate through the first gear and the second gear which are meshed with each other.

Optionally, the ball serving shell is provided with a first opening and a second opening both communicating with the launch channel; the ball throwing assembly includes a second drive part, a third drive part, a first turntable installed at an output end of the second drive part and a second turntable installed at an output end of the third drive part; the second drive part and the third drive part are both installed on the ball serving shell, the first turntable extends into the launch channel through the first opening, and the second turntable extends into the launch channel through the second opening; and the second drive part drives the first turntable to rotate, and the third drive part drives the second turntable to rotate, so as to squeeze and throw the to-be-thrown object out of the launch channel.

Optionally, the ball throwing assembly further includes a mounting base and a moving drive part, and the second drive part and the third drive part are both installed on the ball serving shell through the mounting base; the moving drive part is connected with the ball serving shell, and is used for driving the first turntable and the second turntable to move and clamp the to-be-thrown object through the mounting base.

Optionally, the moving drive part includes a fourth drive part, a third gear installed at an output end of the fourth drive part, and a rack arranged on the mounting base; the fourth drive part is installed on the mounting base, and the mounting base is driven to move by the third gear and the rack which are meshed with each other.

Optionally, the ball throwing assembly further includes a slide bar installed on the ball serving shell and a bearing installed on the mounting base; the slide bar passes through an inner hole of the bearing, and the slide bar is parallel to an direction in which the moving drive part drives the mounting base to move.

Optionally, the ball throwing assembly further includes a conveying drive part, a conveying belt, a first pulley and a second pulley; the conveying belt is sleeved on the first pulley and the second pulley; the conveyor belt is positioned in the launch channel, and an output end of the conveying drive part is connected with the first pulley or the second pulley.

Optionally, the pet ball launcher further includes a housing provided with an internal space, the avoidance drive assembly, the ball throwing assembly and the ball serving shell are all installed in the internal space.

Optionally, the avoidance drive assembly further includes a fifth drive part, a fourth gear installed at an output end of the fifth drive part, and an arc rack arranged on an inner wall of the internal space; the fourth gear is engaged with the arc rack, and the fifth drive part is installed on the ball serving shell; the fifth drive part is used for driving the ball serving shell to rotate through the fourth gear and the arc rack which are engaged with each other.

Optionally, the housing is further provided with an arc groove communicating with the ball storage space.

Optionally, the housing is provided with a plurality of support legs distributed at intervals.

According to the present application, the ball throwing assembly can throw out the to-be-thrown object in the launch channel, and the to-be-thrown object thrown out of the launch channel can attract pets such as dogs to chase and play, thus achieving the function of walking pets. Moreover, when the sensor detects that there is an obstacle in front of the launch channel, the avoidance drive assembly drives the ball serving shell to rotate by a preset angle, the ball throwing assembly throws the to-be-thrown object out of the launch channel, so that the to-be-thrown object thrown from the launch channel avoids the obstacle; the sensor can automatically detect whether there is an obstacle in front of the launch channel, so that the to-be-thrown object thrown from the launch channel is able to avoid the obstacle, thus preventing the accident that the to-be-thrown object thrown from the launch channel hurts people, and improving the safety of the pet ball launcher. In addition, when the avoidance drive assembly drives the ball serving shell to rotate, the ball throwing assembly throws the to-be-thrown object out of the launch channel, and different to-be-thrown objects are thrown from different directions, thus attracting pets to chase the to-be-thrown objects in different directions, and improving user experience of the pet ball launcher. Also, the pet ball launcher is simple in structure and low in manufacturing cost.

BRIEF DESCRIPTION OF THE DRAWINGS

The application is further illustrated with reference to the following drawings and embodiments.

Reference signs in the figures are as follows:

1. Avoidance drive assembly; 11. First drive part; 12. First gear; 101. Fifth drive part; 102. Fourth gear; 103. Arc rack; 2. Ball throwing assembly; 21. Second drive part; 22. First turntable; 23. Second turntable; 24. Mounting base; 25. Moving drive part; 251. Fourth drive part; 252. Third gear; 253. Rack; 26. Slide bar; 27. Bearing; 201. Conveying drive part; 202. Conveyor belt; 3. Ball serving shell; 31. Ball storage space; 32. Launch channel; 33. First opening; 4. Housing; 41. Arc groove; 42. Support leg; 100. To-be-thrown object.

DETAILED DESCRIPTION OF DISCLOSED EMBODIMENTS

In order to make the beneficial effects, technical solutions and technical problems solved by the present application clearer, the present application will be further illustrated in detail with reference to the drawings and embodiments. It should be understood that the specific embodiments described here are merely for illustrating the present application, but not for limiting the present application.

It should be understood that the directions or positional relationships indicated by the terms "upper", "lower", "left", "right", "front", "back" and "middle" are based on the directions or positional relationships shown in the drawings, only for convenience of describing the present application and simplifying the descriptions, instead of indicating or implying that the device or element must have a specific orientation, be constructed or operated in a specific orientation, and therefore cannot be understood as a limitation of the present application.

Figure 1:
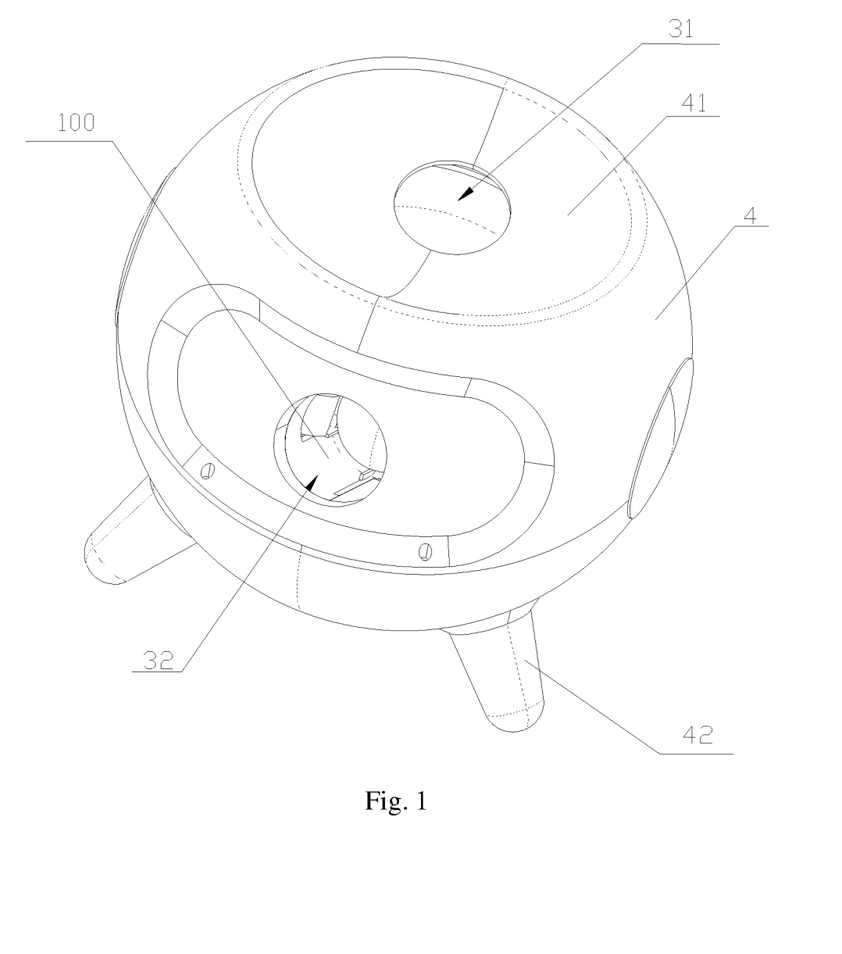
FIG. 1 is a structural schematic diagram of a pet ball launcher provided by an embodiment of the present application.
Figure 2:
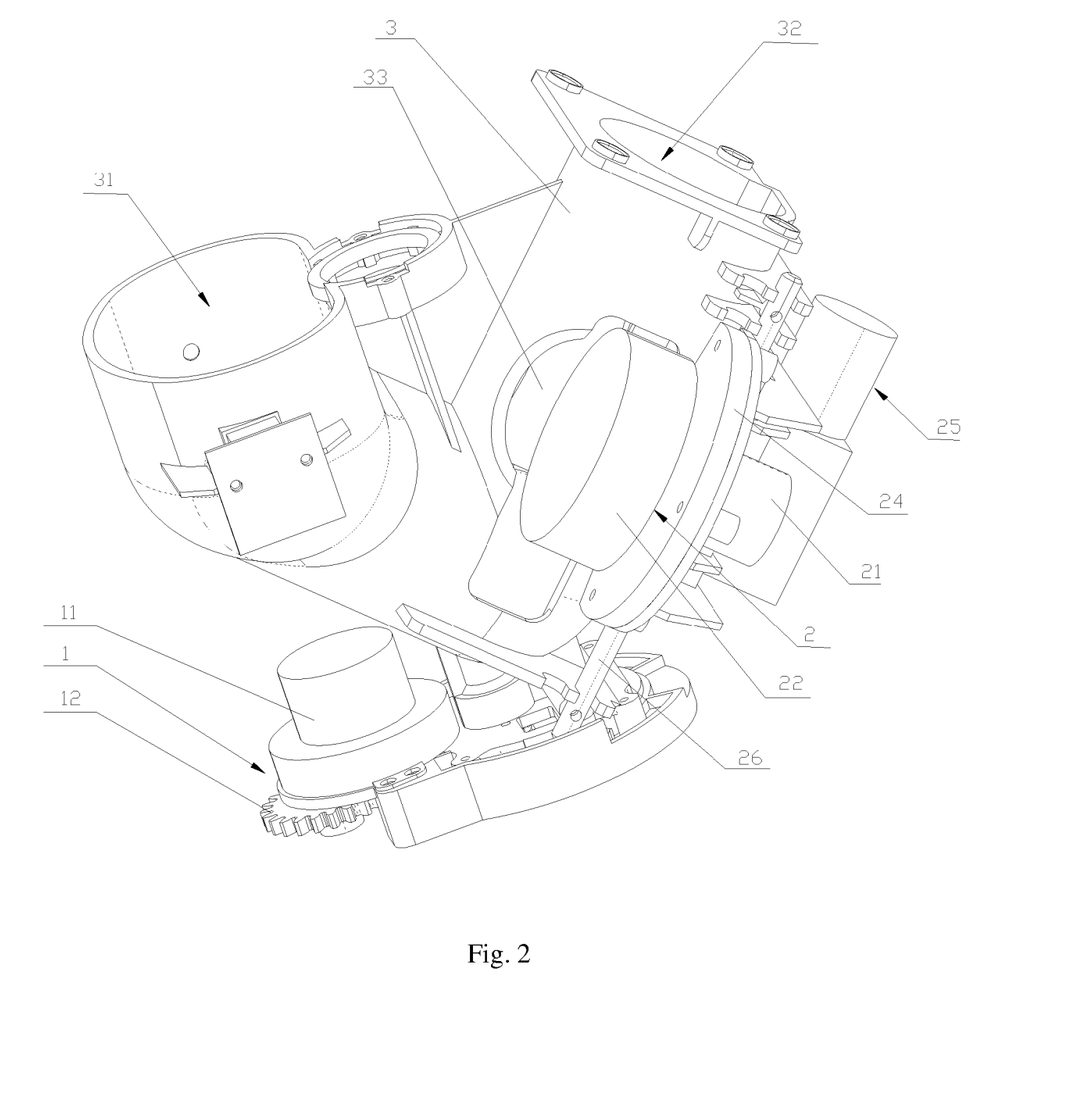
FIG. 2 is a partial structural diagram of a pet ball launcher provided by an embodiment of the present application.
Figure 3:
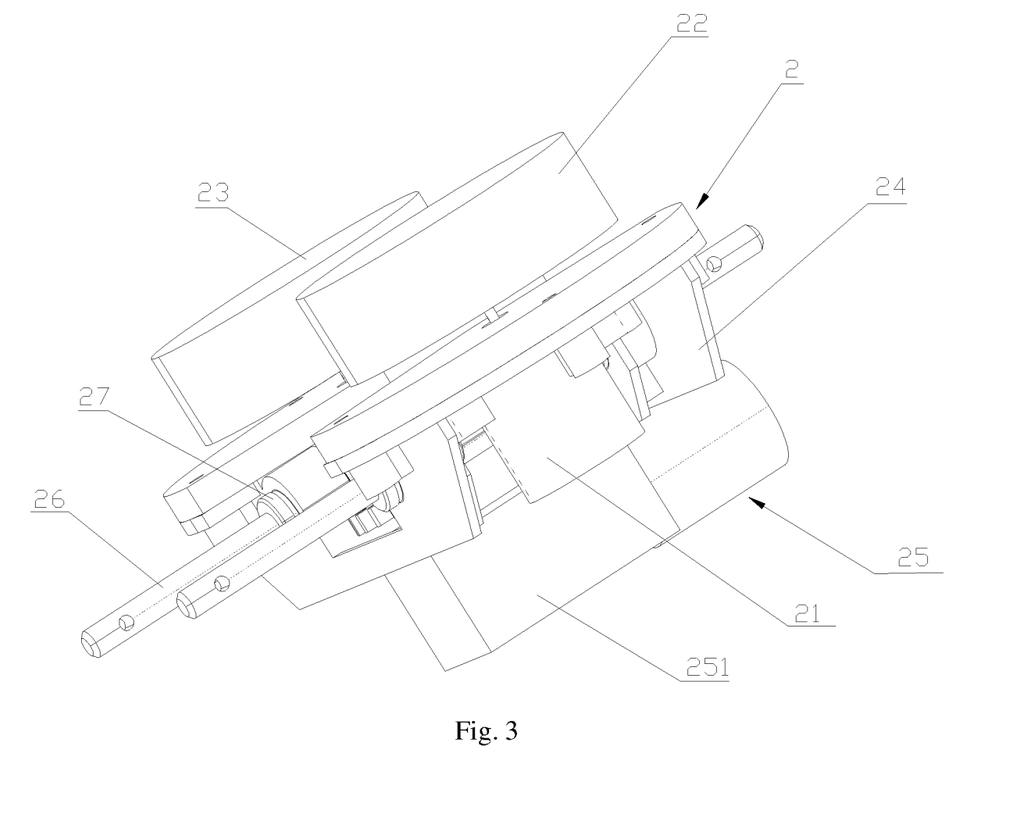
FIG. 3 is a structural schematic diagram of a ball throwing assembly of the pet ball launcher provided by an embodiment of the present application.
Figure 6:
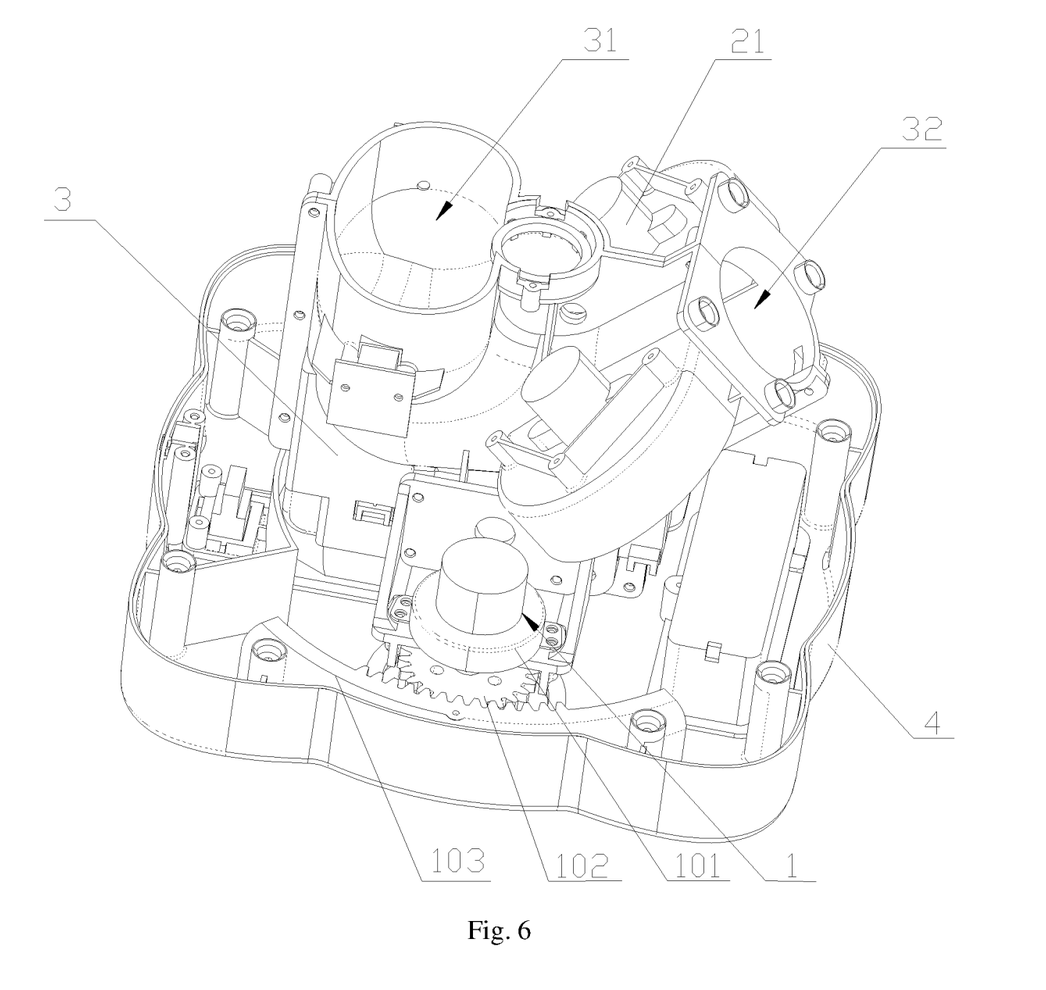
FIG. 6 is a partial structural diagram of a pet ball launcher provided by another embodiment of the present application.

As shown in FIG. 1, FIG. 2 and FIG. 6, the present application provides a pet ball launcher, including an avoidance drive assembly 1, a ball throwing assembly 2, a sensor (not shown) and a ball serving shell 3. The ball serving shell 3 is provided with a ball storage space 31 and a launch channel 32 communicating with the ball storage space 31, and the sensor is installed at the outlet of the launch channel 32; the output end of the avoidance drive assembly 1 is connected to the ball serving shell 3, and the ball throwing assembly 2 is installed on the ball serving shell 3; understandably, the avoidance drive assembly 1 is used to drive the ball serving shell 3 and the ball throwing assembly 2 to rotate, and the ball throwing assembly 2 is used to throw out a to-be-thrown object 100 in the launching space; the to-be-thrown object 100 includes but is not limited to toy ball and the like. The sensor includes but is not limited to a pyroelectric infrared sensor, video camera and the like.

Furthermore, the ball throwing assembly 2 includes but is not limited to, an extrusion launching part, ejection launching part, etc., wherein the ejection launching part may be composed of a compression spring, an actuating pneumatic cylinder, an actuating hydraulic cylinder, etc.

when the sensor detects that there is an obstacle in front of the launch channel 32, the avoidance drive assembly 1 drives the ball serving shell 3 to rotate by a preset angle, the ball throwing assembly 2 throws out a to-be-thrown object 100 from the launch channel 32, so that the to-be-thrown object 100 thrown out of the launch channel 32 avoids the obstacle. Understandably, the preset angle may be set according to actual requirements (for example, rotating by 15 degrees, 20 degrees, 30 degrees, etc.), and after the ball serving shell 3 rotates by the preset angle, the outlet of the launch channel 32 would not aim at the obstacle; the obstacle includes but is not limited to people.

Furthermore, when the sensor detects that there is no obstacle in front of the launch channel 32, the ball throwing assembly 2 directly throws out the to-be-thrown object 100 from the launch channel 32.

In the present application, the ball throwing assembly 2 can throw out the to-be-thrown object 100 in the launch channel 32, and the to-be-thrown object 100 thrown out of the launch channel 32 can attract pets such as dogs to chase and play, thus achieving the function of walking pets. Moreover, when the sensor detects that there is an obstacle in front of the launch channel 32, the avoidance drive assembly 1 drives the ball serving shell 3 to rotate by a preset angle, the ball throwing assembly 2 throws the to-be-thrown object 100 out of the launch channel 32, so that the to-be-thrown object 100 thrown from the launch channel 32 avoids the obstacle; the sensor can automatically detect whether there is an obstacle in front of the launch channel 32, so that the to-be-thrown object 100 thrown from the launch channel 32 is able to avoid the obstacle, thus preventing the accident that the to-be-thrown object 100 thrown from the launch channel 32 hurts people, and improving the safety of the pet ball launcher. In addition, when the avoidance drive assembly 1 drives the ball serving shell 3 to rotate, the ball throwing assembly 2 throws the to-be-thrown object 100 out of the launch channel 32, and different to-be-thrown objects 100 are thrown from different directions, thus attracting pets to chase the to-be-thrown objects 100 in different directions, and improving user experience of the pet ball launcher. Also, the pet ball launcher is simple in structure and low in manufacturing cost.

In an embodiment, as shown in FIG. 2, the avoidance drive assembly 1 includes a first drive part 11, a first gear 12 installed at the output of the first drive part 11, and a second gear (not shown) installed on the ball serving shell 3; the first gear 12 is meshed with the second gear, and the first drive part 11 drives the ball serving shell 3 to rotate through the first gear 12 and the second gear which are meshed with each other. Understandably, the first drive part 11 includes but is not limited to a motor, etc. The first drive part 11 drives the first gear 12 to rotate, and the first gear 12 drives the ball serving shell 3 to rotate through the second gear. In this embodiment, the rotation angle of the ball serving shell 3 is large, and the pet ball launcher is simple in structure and low in manufacturing cost.

In an embodiment, as shown in FIG. 2 to FIG. 4 and FIG. 6, the ball serving shell 3 is provided with a first opening 33 and a second opening both communicating with the launch channel 32. The ball throwing assembly 2 includes a second drive part 21, a third drive part, a first turntable 22 installed at the output of the second drive part 21, and a second turntable 23 installed at the output of the third drive part. The second drive part 21 and the third drive part are both installed on the ball serving shell 3, the first turntable 22 extends into the launch channel 32 through the first opening 33, and the second turntable 23 extends into the launch channel 32 through the second opening. Understandably, the first opening 33 and second opening are respectively distributed on opposite sides of the ball serving shell 3, and the second drive part 21 and the third drive part both include, but are not limited to, motors and the like, and the second drive part 21 and the third drive part are respectively arranged on opposite sides of the ball serving shell 3; a side of the first turntable 22 passes through the first opening 33 and extends into the launch channel 32, and a side of the second turntable 23 passes through the second opening and extends into the launch channel 32.

The second drive part 21 drives the first turntable 22 to rotate, and the third drive part drives the second turntable 23 to rotate, so as to squeeze and throw the to-be-thrown object 100 out of the launch channel 32. Specifically, the second drive part 21 drives the first turntable 22 to rotate, and the third drive part drives the second turntable 23 to rotate. When the to-be-thrown object 100 in the ball storage space 31 enters between the first turntable 22 and the second turntable 23, because the to-be-thrown object 100 has certain elasticity, it can be pressed by the rotating first turntable 22 and second turntable 23, and thrown out of the outlet of the launch channel 32. In this embodiment, the to-be-thrown object 100 is squeezed and thrown out by the rotating first turntable 22 and second turntable 23, so that the to-be-thrown object 100 thrown out of the launch channel 32 is high and far, thus improving user experience of the pet ball launcher.

In an embodiment, as shown in FIG. 2 to FIG. 5, the ball throwing assembly 2 further includes a mounting base 24 and a moving drive part 25; the second drive part 21 and the third drive part are both mounted on the ball serving shell 3 through the mounting base 24. The moving drive part 25 is connected to the ball serving shell 3, and is used to drive the first turntable 22 and the second turntable 23 to move and clamp the to-be-thrown object 100 through the mounting base 24. Understandably, the moving drive part 25 includes, but is not limited to, pneumatic cylinder, hydraulic cylinder, feed screw nut mechanism, linear motor, gear rack mechanism, etc. The mounting base 24 is installed on the ball serving shell 3, and the second drive part 21 and the third driver are both installed on the mounting base 24. Specifically, during the rotation of the first turntable 22 and second turntable 23, the moving drive part 25 moves downward through the mounting base 24, the mounting base 24 drives the first turntable 22 and second turntable 23 to move downward, and the first turntable 22 and second turntable 23 that move downward would squeeze the to-be-thrown object 100 in the launching channel 32, so that the to-be-thrown object 100 in the launching channel 32 could be ejected. In this embodiment, the design of the moving drive part 25 improves the stability of the pet ball launcher and avoids the situation that the first turntable 22 and second turntable 23 cannot clamp the to-be-thrown object 100.

Figure 4:
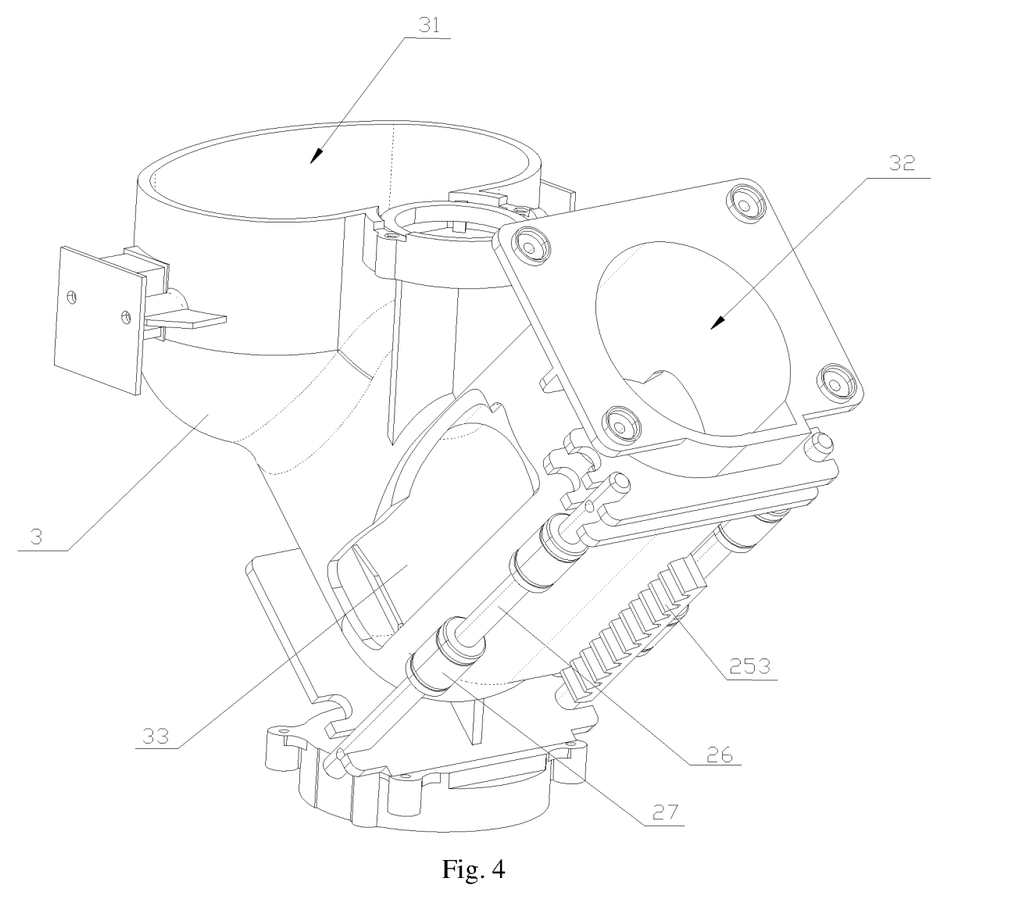
FIG. 4 is a structural schematic diagram of a ball serving shell of the pet ball launcher provided by an embodiment of the present application.
Figure 5:
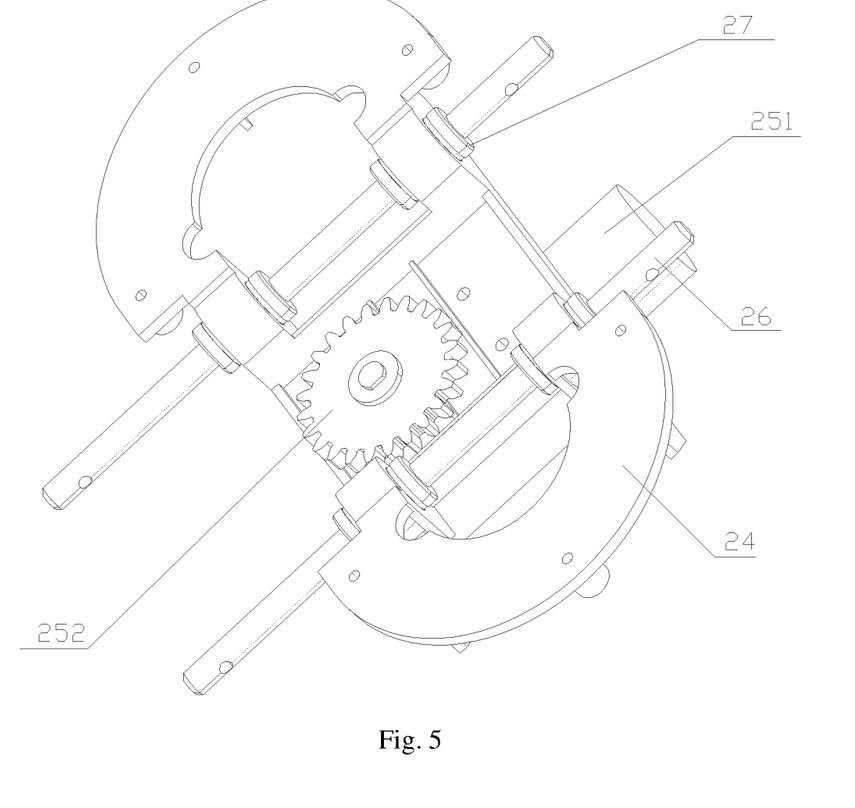
FIG. 5 is a partial structural diagram of a ball throwing assembly of the pet ball launcher provided by an embodiment of the present application.

In an embodiment, as shown in FIGS. 4 and 5, the moving drive part 25 includes a fourth drive part 251, a third gear 252 installed at the output end of the fourth drive part 251, and a rack 253 arranged on the mounting base 24. The fourth drive part 251 is installed on the mounting base 24, and drives the mounting base 24 to move through the third gear 252 and the rack 253 which are engaged with each other. Understandably, the fourth drive part 251 includes, but is not limited to, a motor, etc., and the rack 253 and the mounting base 24 are integrally formed. Specifically, the fourth drive part 251 drives the third gear 252 to rotate, and because the third gear 252 is engaged with the rack 253, the third gear 252 drives the mounting base 24 to move along the launch channel 32, and the first turntable 22 and second turntable 23 would clamp the to-be-thrown object 100 in the launch channel 32. In this embodiment, the pet ball launcher is simple in structure and low in manufacturing cost.

In an embodiment, as shown in FIGS. 4 and 5, the ball throwing assembly 2 further includes a slide bar 26 installed on the ball serving shell 3 and a bearing 27 installed on the mounting base 24. The slide bar 26 passes through an inner hole of the bearing 27, and the slide bar 26 is parallel to the direction in which the moving drive part 25 drives the mounting base 24 to move. Understandably, the front and rear ends of the bearing 27 are both installed on the ball serving shell 3. During the moving drive part 25 driving the mounting base 24 to move, the mounting base 24 slides along the slide bar 26 through the bearing 27, thus ensuring the stability of the mounting base 24.

Figure 8:
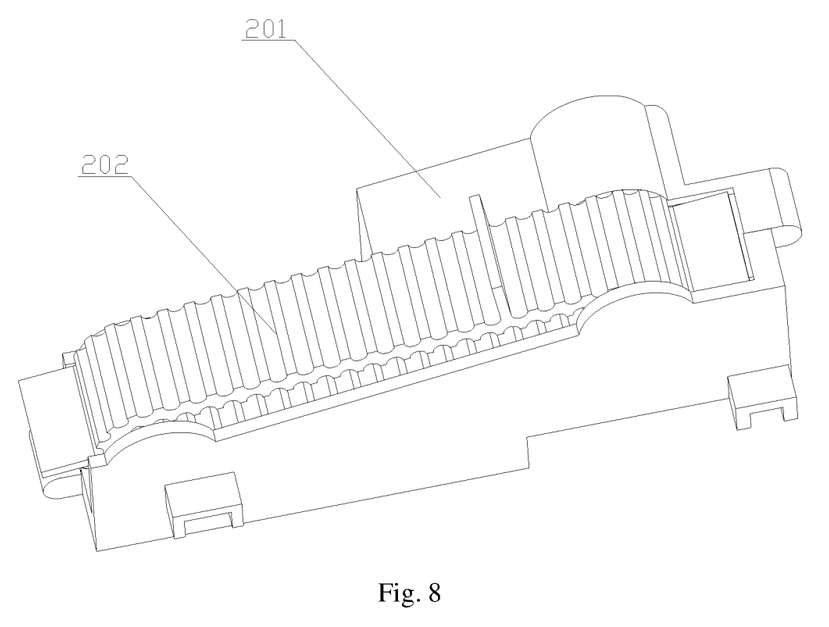
FIG. 8 is a structural schematic diagram of a conveying drive part and a conveyor belt of the pet ball launcher provided by an embodiment of the present application.

In an embodiment, as shown in FIG. 8, the ball throwing assembly 2 further includes a conveying drive part 201, a conveying belt 201, a first pulley (not shown) and a second pulley (not shown); the conveying belt 202 is sleeved on the first pulley and the second pulley; the conveyor belt 202 is positioned in the launch channel 32, and an output end of the conveying drive part 201 is connected with the first pulley or the second pulley. Understandably, the conveyor belt 202 is arranged at the bottom of the launch channel 32, and the conveying drive part 201 includes but is not limited to a motor. Specifically, the to-be-thrown object 100 in the ball storage space 31 would fall on the conveyor belt 202, and the conveying drive part 201 would drive the first pulley and second pulley to rotate. The first pulley and second pulley drive the conveyor belt 202 to move, and the conveyor belt 202 would drive the to-be-thrown object 100 thereon to move to the position between the first turntable 22 and second turntable 23, so that the first turntable 22 and second turntable 23 would press and throw out the to-be-thrown object 100.

Preferably, as shown in FIG. 8, the conveyor belt 202 is further provided with a blocking part for pushing the to-bethrown object 100. Understandably, the blocking part protrudes on the conveyor belt 202, and the blocking part can prevent the to-be-thrown object 100 from rolling on the conveyor belt 202, thus ensuring that the conveyor belt 202 can transport the to-be-thrown object 100 to the position between the first turntable 22 and second turntable 23. In this embodiment, the pet ball launcher is simple in structure and low in manufacturing cost.

In an embodiment, as shown in FIG. 1, the pet ball launcher further includes a housing 4 provided with an internal space, in which the avoidance drive assembly 1, the ball throwing assembly 2 and the ball serving shell 3 are all installed. Understandably, the inlet of the ball storage space 31 communicates with the top of the housing 4, and the outlet of the launch channel 32 communicates with the front of the housing 4. In this embodiment, the housing 4 can protect the components in the internal space, thus prolonging the service life of the pet ball launcher. Moreover, the housing 4 can be designed into different shapes according to actual requirements, which improves the aesthetics of the pet ball launcher.

Figure 7:
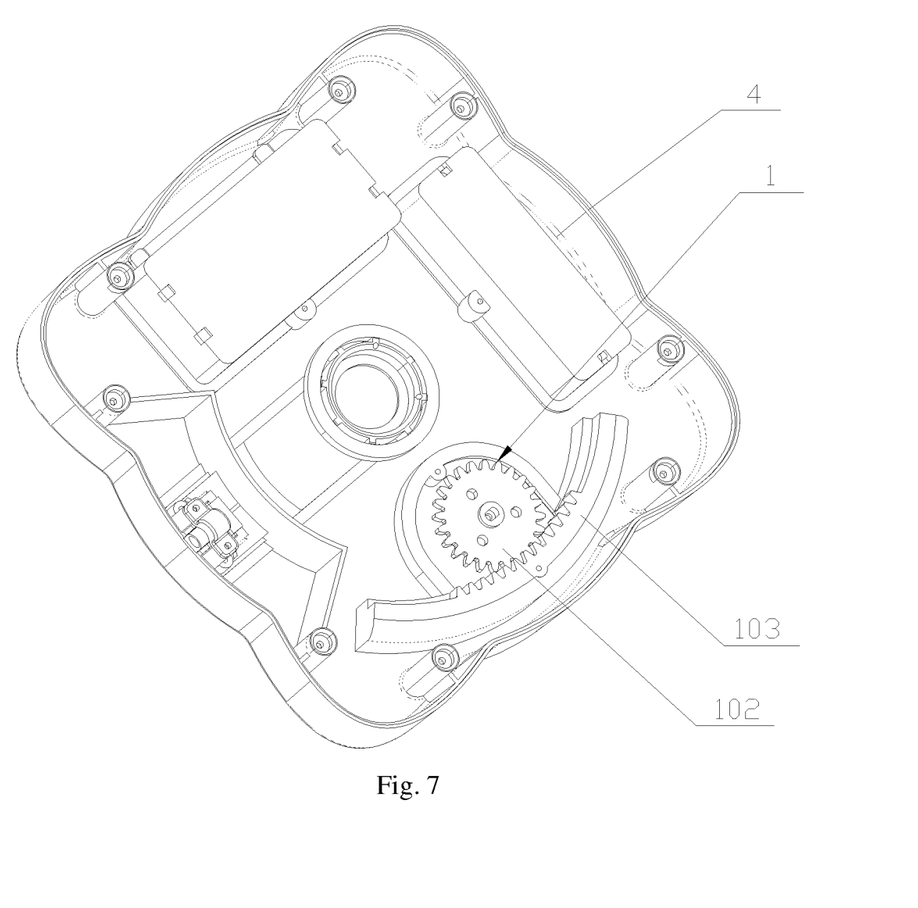
FIG. 7 is a structural schematic diagram of an avoidance drive assembly of the pet ball launcher provided by an embodiment of the present application.

In an embodiment, as shown in FIGS. 6 and 7, the avoidance drive assembly 1 further includes a fifth drive part 101, a fourth gear 102 installed at the output end of the fifth drive part 101, and an arc rack 103 arranged on the inner wall of the internal space. The fourth gear 102 is engaged with the arc rack 103, and the fifth drive part 101 is installed on the ball serving shell 3. The fifth drive part 101 is used to drive the ball serving shell 3 to rotate through the fourth gear 102 and arc rack 103 which are meshed with each other. Understandably, the fifth drive part 101 includes but is not limited to a motor and the like, and the arc rack 103 is arranged at the bottom of the internal space. Specifically, the fifth drive part 101 drives the fourth gear 102 to rotate, and the fourth gear 102 would rotate along the arc rack 103, so that the fourth gear 102 can drive the ball serving shell 3 to rotate, thus the to-be-thrown object 100 thrown out of the launch channel 32 can go over the obstacle. In this embodiment, the avoidance drive assembly 1 is simple in structure and low in manufacturing cost.

In an embodiment, as shown in FIG. 1, the housing 4 is further provided with an arc groove 41 communicating with the ball storage space 31. Understandably, the arc groove 41 is arranged at the top of the housing 4, and the bottom of the arc groove 41 communicates with the ball storage space 31. Users can put the to-be-thrown object 100 in the arc groove 41, and the to-be-thrown object 100 in the arc groove 41 would automatically drop into the ball storage space 31, thus improving user experience of the pet ball launcher.

In an embodiment, as shown in FIG. 1, the housing 4 is further provided with a plurality of support legs 42 distributed at intervals. Understandably, the number of the support legs 42 may be set according to actual requirements, such as 3, 4, etc., and the pet ball launcher is placed on the ground through the support legs 42.

The above descriptions are only preferred embodiments of the present application and are not intended to limit the present application. Any modifications, equivalent substitutions and improvements made within the spirit and principle of the present application shall be included in the protection scope of the present application.

What is claimed is:

1. A pet ball launcher, comprising an avoidance drive assembly, a ball throwing assembly, a sensor and a ball serving shell; the ball serving shell is provided with a ball storage space and a launch channel communicated with the ball storage space, and the sensor is installed at an outlet of the launch channel; an output end of the avoidance drive assembly is connected with the ball serving shell, and the ball throwing assembly is installed on the ball serving shell;
when the sensor detects that there is an obstacle in front of the launch channel, the avoidance drive assembly drives the ball serving shell to rotate by a preset angle, the ball throwing assembly throws out a to-be-thrown object from the launch channel, so that the to-be-thrown object thrown out of the launch channel avoids the obstacle;
the pet ball launcher further comprises a housing provided with an internal space, the avoidance drive assembly, the ball throwing assembly and the ball serving shell are all installed in the internal space; and
the avoidance drive assembly further comprises a fifth drive part, a fourth gear installed at an output end of the fifth drive part, and an arc rack arranged on an inner wall of the internal space; the fourth gear is engaged with the arc rack, and the fifth drive part is installed on the ball serving shell; the fifth drive part is used for driving the ball serving shell to rotate through the fourth gear and the arc rack engaged with each other.

2. The pet ball launcher of claim 1, wherein the avoidance drive assembly comprises a first drive part, a first gear installed at an output end of the first drive part, and a second gear installed on the ball serving shell; the first gear is meshed with the second gear, and the first drive part drives the ball serving shell to rotate through the first gear and the second gear meshed with each other.

3. The pet ball launcher of claim 1, wherein the ball serving shell is provided with a first opening and a second opening both communicating with the launch channel; the ball throwing assembly comprises a second drive part, a third drive part, a first turntable installed at an output end of the second drive part and a second turntable installed at an output end of the third drive part; the second drive part and the third drive part are both installed on the ball serving shell, the first turntable extends into the launch channel through the first opening, and the second turntable extends into the launch channel through the second opening; and
the second drive part drives the first turntable to rotate, and the third drive part drives the second turntable to rotate, so as to squeeze and throw the to-be-thrown object out of the launch channel.

4. The pet ball launcher of claim 3, wherein the ball throwing assembly further comprises a mounting base and a moving drive part, and the second drive part and the third drive part are both installed on the ball serving shell through the mounting base; the moving drive part is connected with the ball serving shell, and is used for driving the first turntable and the second turntable to move and clamp the to-be-thrown object through the mounting base.

5. The pet ball launcher of claim 4, wherein the moving drive part comprises a fourth drive part, a third gear installed at an output end of the fourth drive part, and a rack arranged on the mounting base; the fourth drive part is installed on the mounting base, and the mounting base is driven to move by the third gear and the rack meshed with each other.

6. The pet ball launcher of claim 4, wherein the ball throwing assembly further comprises a slide bar installed on the ball serving shell and a bearing installed on the mounting base; the slide bar passes through an inner hole of the bearing, and the slide bar is parallel to an direction in which the moving drive part drives the mounting base to move.

7. The pet ball launcher of claim 4, wherein the ball throwing assembly further comprises a conveying drive part, a conveying belt, a first pulley and a second pulley; the conveying belt is sleeved on the first pulley and the second pulley; the conveyor belt is positioned in the launch channel, and an output end of the conveying drive part is connected with the first pulley or the second pulley.

8. The pet ball launcher of claim 1, wherein the housing is further provided with an arc groove communicating with the ball storage space; and/or the housing is provided with a plurality of support legs distributed at intervals.

\* \* \* \* \*